(12) United States Patent
Ooka et al.

(10) Patent No.: US 10,391,953 B2
(45) Date of Patent: Aug. 27, 2019

(54) SKIN-COVERED INTERIOR TRIM PAD

(71) Applicant: NIHON PLAST CO., LTD., Shizuoka (JP)

(72) Inventors: Masahiro Ooka, Shizuoka (JP); Yohei Kiuchi, Shizouka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 113 days.

(21) Appl. No.: 15/642,458

(22) Filed: Jul. 6, 2017

(65) Prior Publication Data

US 2018/0009396 A1    Jan. 11, 2018

(30) Foreign Application Priority Data

Jul. 7, 2016 (JP) ................. 2016-135505

(51) Int. Cl.
  *B60R 13/02* (2006.01)
  *B60R 21/203* (2006.01)
  *B60R 21/215* (2011.01)
  *B32B 9/02* (2006.01)
(52) U.S. Cl.
  CPC ............. *B60R 13/02* (2013.01); *B32B 9/025* (2013.01); *B60R 21/203* (2013.01); *B60R 21/215* (2013.01)
(58) Field of Classification Search
  CPC ...................................... B60R 13/02
  USPC ......................................... 428/119
  See application file for complete search history.

(56) References Cited

U.S. PATENT DOCUMENTS

2014/0132030 A1\* 5/2014 Usami ................. B60R 13/0243
                                                            296/153

FOREIGN PATENT DOCUMENTS

DE     10213222713 A1    5/2014
JP     2005-145329 A    6/2005

OTHER PUBLICATIONS

Extended European Search Report issued in EP 17180000.6, dated Sep. 19, 2017.

\* cited by examiner

*Primary Examiner* — Brent T O'Hern
(74) *Attorney, Agent, or Firm* — Brundidge & Stanger, P.C.

(57) ABSTRACT

A skin-covered interior trim pad according to one aspect of the present disclosure includes a main portion, eaves portion 39 extending out from an outer edge of the main portion, and skin 36 covering the main portion and eaves portion 36, in which: skin 36 includes end edge portion 36d curving along an end portion of eaves portion 39, eaves-front-surface portion 36a covering front surface 39b of eaves portion 39 on a side of front surface 39b of eaves portion 39, and eaves-back-surface portion 36b which extends on a side of back surface 39c of eaves portion 39 toward the outer edge to cover back surface 39c of eaves portion 39, eaves-back-surface portion 36b having the same thermal shrinkage rate as the eaves-front-surface portion, and eaves-front-surface portion 36a being located across end edge portion 36d from eaves-back-surface portion 36b.

3 Claims, 5 Drawing Sheets

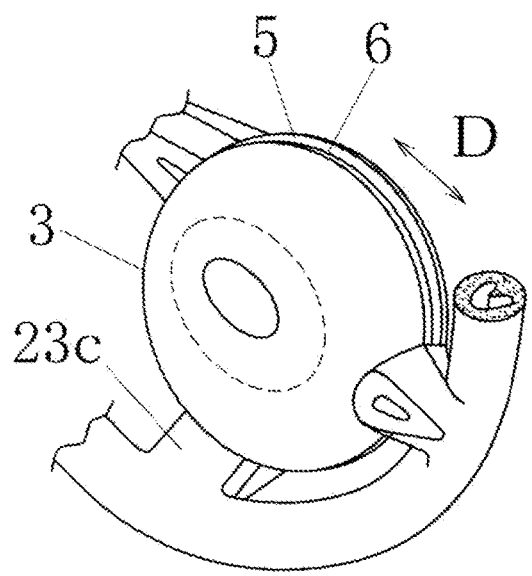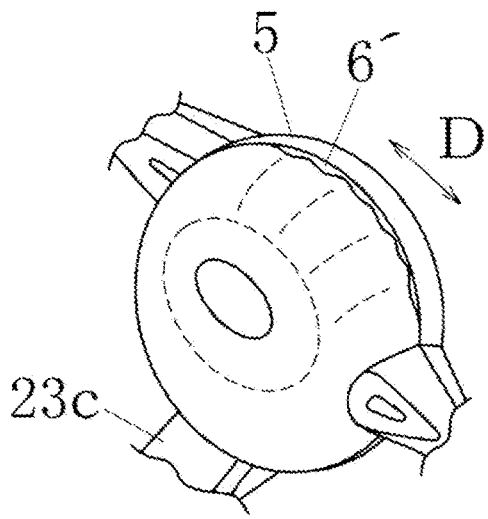
FIG. 5A  FIG. 5B
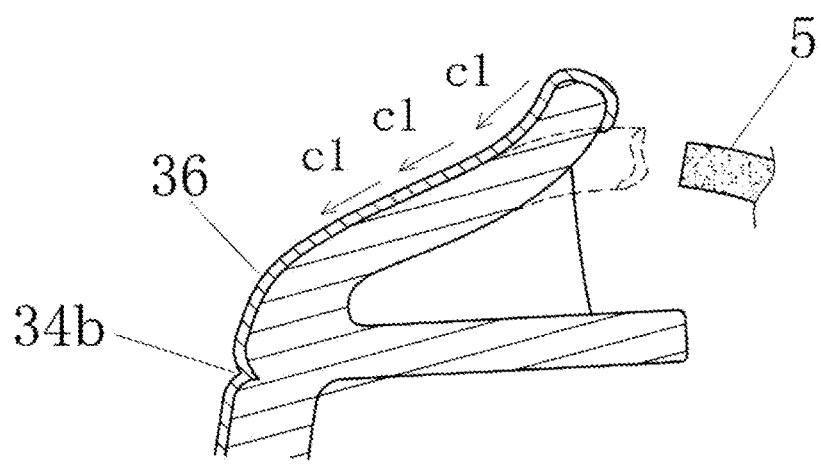
FIG. 5C

SKIN-COVERED INTERIOR TRIM PAD

CROSS REFERENCE TO RELATED APPLICATIONS

This application is entitled to and claims the benefit of Japanese Patent Application No. 2016-135505 filed on Jul. 7, 2016, the disclosure of which including the specification, drawings and abstract is incorporated herein by reference in its entirety.

TECHNICAL FIELD

The present invention relates to an interior trim pad provided with a skin that is used in automobiles and the like, for example, to a steering wheel pad, passenger-side airbag cover, door trim, door-mounted side airbag cover, pillar garnish, and the like.

BACKGROUND ART

A leather-covered pad cover has been known as a conventional art which is disposed to cover an airbag folded and stored in a boss section of a steering wheel and includes a rupture-expected part to be ruptured to form an opening in the leather-covered pad cover for allowing the airbag to project from the opening when the leather-covered pad cover is pushed by the inflated airbag, a cover main body, and a leather sheet disposed on a surface of the cover main body. In the leather-covered pad cover, the rupture-expected part is formed by a groove extending from a back surface side of the cover main body into the leather sheet, and the groove is formed after the leather sheet is pasted on and integrated with the cover main body (see, for example, claims, specification, and FIGS. 1 to 12 of Japanese Patent Application Laid-Open No. 2005-145329).

SUMMARY OF THE INVENTION

Technical Problem

Interior trim parts covered with natural leather such as one in the conventional art described above have been conventionally applied by preference to a superior automobile model or a higher-grade automobile of the same automobile model, or to a sporty automobile or a high-performance automobile. The product quality of such interior trim parts themselves and a level required for parts combination quality of such interior trim parts are high in order for the interior trim parts to be appropriate for vehicles as stated above.

The thermal shrinkage behaviors of the natural leather and of a resin base material covered therewith, however, are quite different from each other.

That is, the natural leather has the property in that the natural leather shrinks at a high temperature, whereas a resin material forming resin parts has a tendency to inflate when temperature increases. In addition, the resin material is softened to be easily deformed when temperature increases.

A combination portion at which an interior trim part is combined with an adjacent part is sometimes located externally from a mounting piece or upright wall.

By way of example, a center pad and lower cover of a steering wheel are not connected to and not in contact with each other and their edges face each other with a minute clearance therebetween. The center pad serves as a push-button of a horn switch, and bears on a main body of the steering wheel by means of predetermined biasing and guiding mechanisms such that an operational load can be moderate. Accordingly, the position of the center pad cannot be directly restricted, for example, by abutting the center pad against the lower cover. In addition, a line at which the center pad and the lower cover are positioned to each other is visible from a driver or the like, and therefore it is not preferable that the clearance of the line is non-uniform, that is, it is not preferable that the line is wide at some points and narrow at other points.

In a case where the center pad is covered with a skin such as leather, the center pad deforms due to a tensile force applied thereto when the skin shrinks on the center pad (base material) due to high temperature. This causes deterioration in the parts combination quality for combination with adjacent parts, and the clearance is widened to be left open or deforms in a non-uniform manner to have a wavy shape, so that the quality level of the external appearance is reduced. In this way, the object of upgrading by providing leather cannot be achieved.

The object of the present invention is to provide a skin-covered interior trim pad by which the aforementioned problem is solved.

Solutions to Problems

A first aspect of the present invention is a skin-covered interior trim pad as recited in claim 1, which is described as follows:

the skin-covered interior trim pad includes a main portion, an eaves portion extending out from an outer edge of the main portion, and a skin covering the main portion and the eaves portion. In the skin-covered interior trim pad, the skin includes an end edge portion curving along an end portion of the eaves portion, an eaves-front-surface portion covering a front surface of the eaves portion on a side of the front surface of the eaves portion, and an eaves-back-surface portion which extends on a side of a back surface of the eaves portion toward the outer edge to cover the back surface of the eaves portion, the eaves-back-surface portion having the same thermal shrinkage rate as the eaves-front-surface portion, and the eaves-front-surface portion being located across the end edge portion from the eaves-back-surface portion.

A second aspect of the present invention is a skin-covered interior trim pad as recited in claim 2, which is described as follows:

in addition to the features of claim 1, the skin-covered interior trim pad further includes an upright wall protruding from the outer edge on the side of the back surface of the eaves portion, and a rib connecting the back surface of the eaves portion to the upright wall. In the skin-covered interior trim pad, the eaves-back-surface portion includes a cutout opened for the rib.

A third aspect of the present invention is a skin-covered interior trim pad as recited in claim 3, which is described as follows:

in addition to the features of claim 1, the eaves-back-surface portion extends toward the outer edge such that a tensile force cancelling a tensile force applied to the eaves-front-surface portion is applied to the eaves-back-surface portion.

Advantageous Effects of Invention

A skin-covered interior trim pad according to the present invention has the above-described features and thus has the following effects.

(1) An eaves portion, also referred to as an overhang portion, is a portion with the shape of a cantilever which extends out from an outer edge of a main portion, or which is supported by an upright wall and/or mounting piece depending on embodiments. A portion overhanging from the main portion in one direction is very susceptible to loads, that is, a great degree of freedom is allowed in deformation of that portion. The eaves portion is warped up by shrinkage of the skin, so that a clearance defined by the eaves portion and an adjacent portion increases. In addition, the eaves portion is lifted, so that these two portions which are designed such as to present a contiguous surface are made discontiguous and accordingly the external appearance is marred.

In the present invention, shrinkage is generated on both front and back sides of a base material and accordingly deformation of the eaves portion is reduced, so that a good external appearance can be achieved in a wide temperature range.

(2) The present invention can equalize deformation at places where a connecting rib is present with that at places where a connecting rib is absent, so as to reduce waving.

(3) By causing the same level of shrinkage on both front and back sides, phenomena of being warped up and lifted due to shrinkage of the skin at the outer surface can be mitigated.

It is preferable that the eaves portion be covered with the skin on the front and back sides integrally. The skin covering the front surface is wound around the edge to extend on the back surface to the vicinity of the upright wall or mounting piece, so as to form a three-layer structure of skin, base material, and skin at the eaves portion.

By integrally covering the front and back surfaces, the skin can follow the shape of the base material at its edge or in the vicinity thereof to cover the base material, and therefore no portion is required on the skin for bonding between the surfaces thereof. The skin can easily be positioned since the edge has a folded-back shape, and accordingly shrinkage on the front and back sides can affect preferably. In addition, processing the edge of the skin is not required and also an increase in the thickness of the skin of when the skin is laid on top of another is not caused. Accordingly, the skin-covered interior trim pad according to the present invention can easily be shaped sharply.

(4) The front and back surfaces may be covered with respective separate skin panels when no importance is attached to the above advantages. In this case, a front surface portion and a small margin for being wound around can be cut from leather as raw material, and the remaining pieces of leather as raw material can be cut to be utilized as a skin for covering the back surface.

In this way, a yield of the skin can be improved, and accordingly a production cost can be reduced. Skins for the front and back surfaces do not have to be cut from a single leather material (raw material) or leather materials of the same kind as long as the front-surface portion and back-surface portion shrink equally or their shrinkage rates are equal to each other, and the front-surface and back-surface portions may also be prepared from different materials having properties similar to each other. In the meanwhile, the process of covering the back surface with the skin is an additional process but is not remarkably difficult by using a suitable jig.

BRIEF DESCRIPTION OF DRAWINGS

FIGS. 5A to 5C illustrate a steering wheel as an embodiment according to the present invention and a steering wheel for the purpose of comparative explanation in which a conventional skin-covered interior trim pad is applied, FIG. 5A is a partly sectioned schematic perspective view of the embodiment of the present invention viewed in the direction of arrow B in FIG. 4, FIG. 5B is a partial perspective view illustrating a portion of the conventional interior trim pad corresponding to the portion illustrated in FIG. 5A, and FIG. 5C is a partially enlarged view of an area including an eaves portion of FIG. 5B.

DESCRIPTION OF EMBODIMENTS

A skin-covered interior trim pad according to one aspect of the present disclosure includes a main portion, an eaves portion extending out from an outer edge of the main portion, and a skin covering the main portion and the eaves portion, in which: the skin includes an end edge portion curving along an end portion of the eaves portion, an eaves-front-surface portion covering a front surface of the eaves portion on a side of the front surface of the eaves portion, and an eaves-back-surface portion which extends on a side of a back surface of the eaves portion toward the outer edge to cover the back surface of the eaves portion, the eaves-back-surface portion having the same thermal shrinkage rate as the eaves-front-surface portion, and the eaves-front-surface portion being located across the end edge portion from the eaves-back-surface portion.

Embodiment 1

One embodiment of the skin-covered interior trim pad according to the present invention will be explained based on the accompanying drawings.

Figure 1:
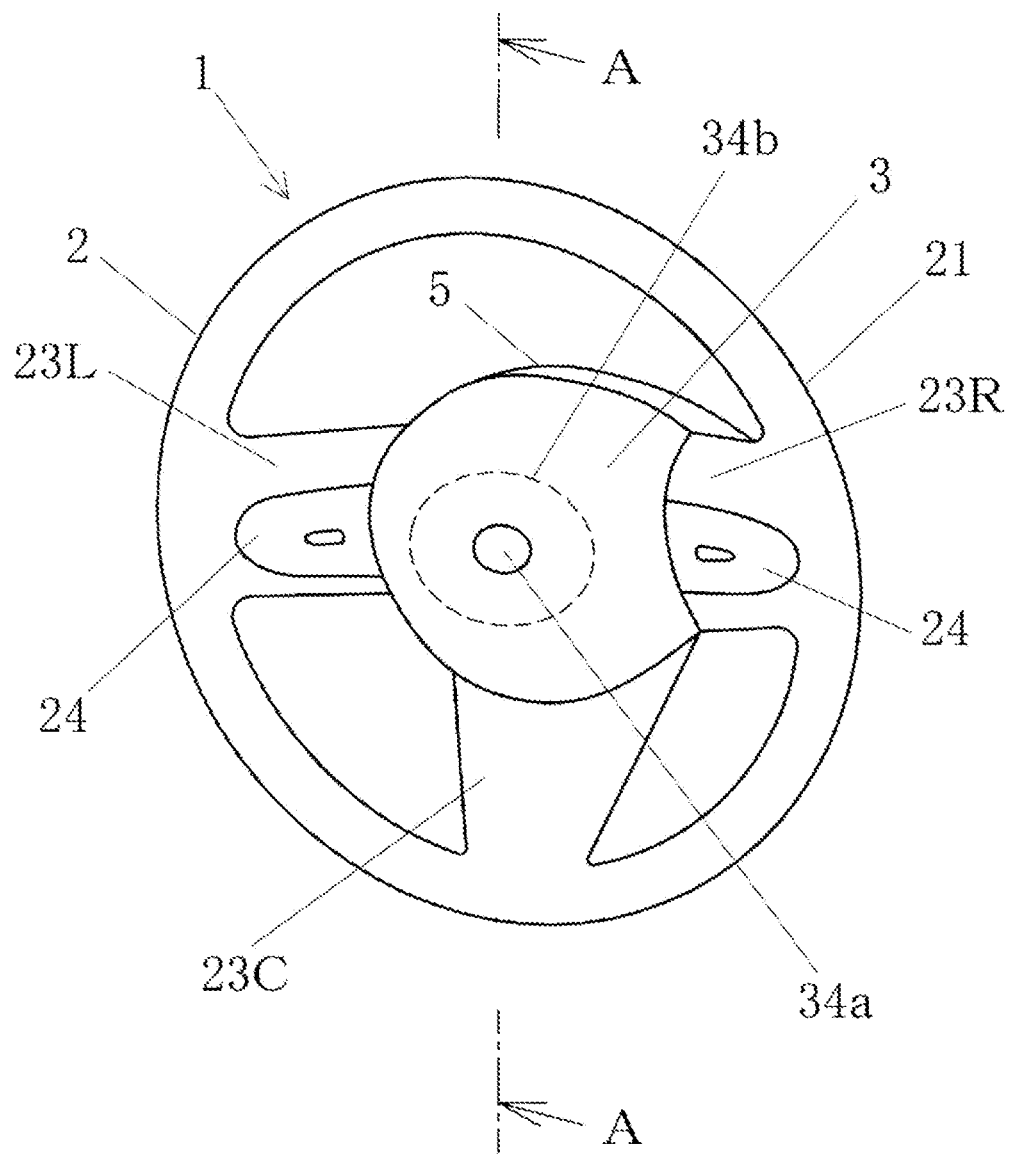
FIG. 1 is an overall perspective view illustrating an exemplary steering wheel in which a skin-covered interior trim pad according to the present invention is adopted.
Figure 2:
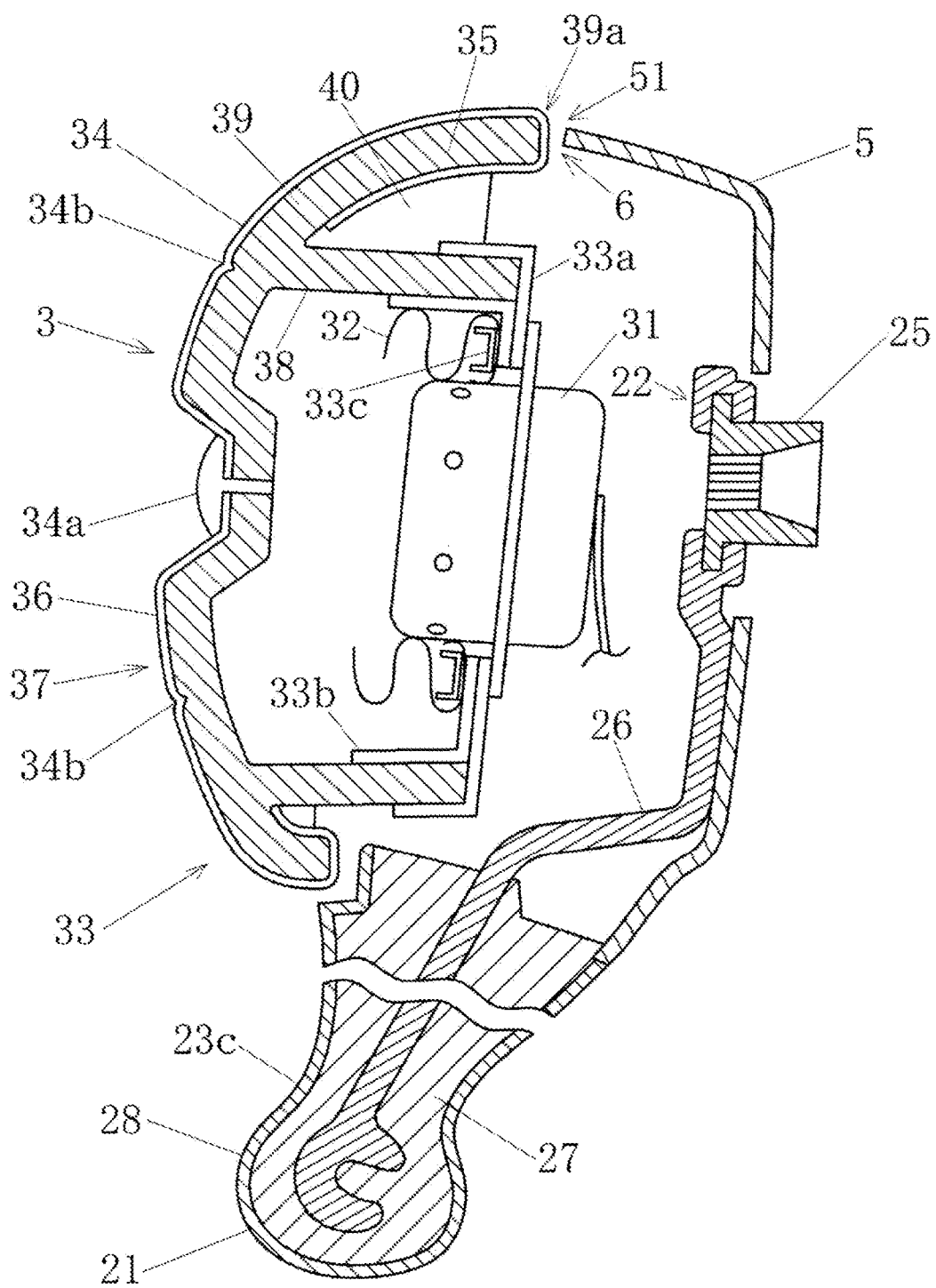
FIG. 2 is a sectional view along line A-A in FIG. 1.

FIG. 1 is an overall perspective view of steering wheel 1, and FIG. 2 is a sectional view along line A-A in FIG. 1. Airbag module 3 is mounted on the center of steering wheel main body 2. Steering wheel main body 2 includes annular rim 21, boss section 22 having, at its central portion, boss 25 to be attached to a shaft on the vehicle body side, and spokes 23 (right spoke 23R, central spoke 23C, and left spoke 23L) to connect rim 21 to boss section 22.

Rim 21 and spokes 23 include core bar 26 made of a light alloy (for example, a magnesium alloy) covered with cover portion 27 of soft foamed polyurethane and, on the surface of cover portion 27, further wrapped with cowhide 28 as natural leather. Finisher 24 is attached to spokes 23 when appropriate, and a base material of finisher 24 made of a resin such as ABS, polycarbonate, or the like is decorated with colors and/or patterns of a silver metallic color, of carbon composite, and of wood-grain pattern by plating, printing, and/or painting. Various switches, indicator, microphone of a hands-free phone, and/or the like may be incorporated into finisher 24.

As illustrated in FIG. 2, airbag module 3 includes container 33 containing airbag 32 which is ordinarily compactly folded and which receives a supply of an inflation gas from inflator 31. Container 33 includes back plate 33a, retainer 33b, and module cover 34, in which airbag 32 is held and fixed onto retainer 33b by means of retaining rings 33c by tightening nuts and bolts (not illustrated).

Module cover 34 includes base material portion 35 molded by means of injection molding of a thermoplastic elastomer resin, and skin 36 that is a cowhide covering the front surface side facing a driver. Module cover 34 is decorated with dummy stitches 34b that are decorations concentric with ornament 34a attached in a recess.

Module cover 34 includes front portion 37 that is a main portion to which the aforementioned ornament 34a is attached and which may be ruptured and opened at a rupture expectation line (not illustrated), upright wall 38 forming a peripheral wall of container 33, and eaves portion 39 extending out in a cantilever fashion from the outer edge of front portion 37 over upright wall 38. Upright wall 38 protrudes from the outer edge of front portion 37 on the side of back surface 39c of eaves portion 39.

Lower cover 5 is attached to steering wheel main body 2 in such a manner as to cover the back surface of airbag module 3. Edge 51 facing end edge portion 39a of eaves portion 39 is disposed at a predetermined spacing from end edge portion 39a, for example, at a spacing of 2 mm such that edge 51 and end edge portion 39a defines therebetween clearance 6 having a longitudinally constant width.

Lower cover 5 is molded by means of injection molding of a polypropylene resin, for example, and the outer surface of lower cover 5 is provided with a grain having a color tone and texture that match skin 36.

Figure 3:
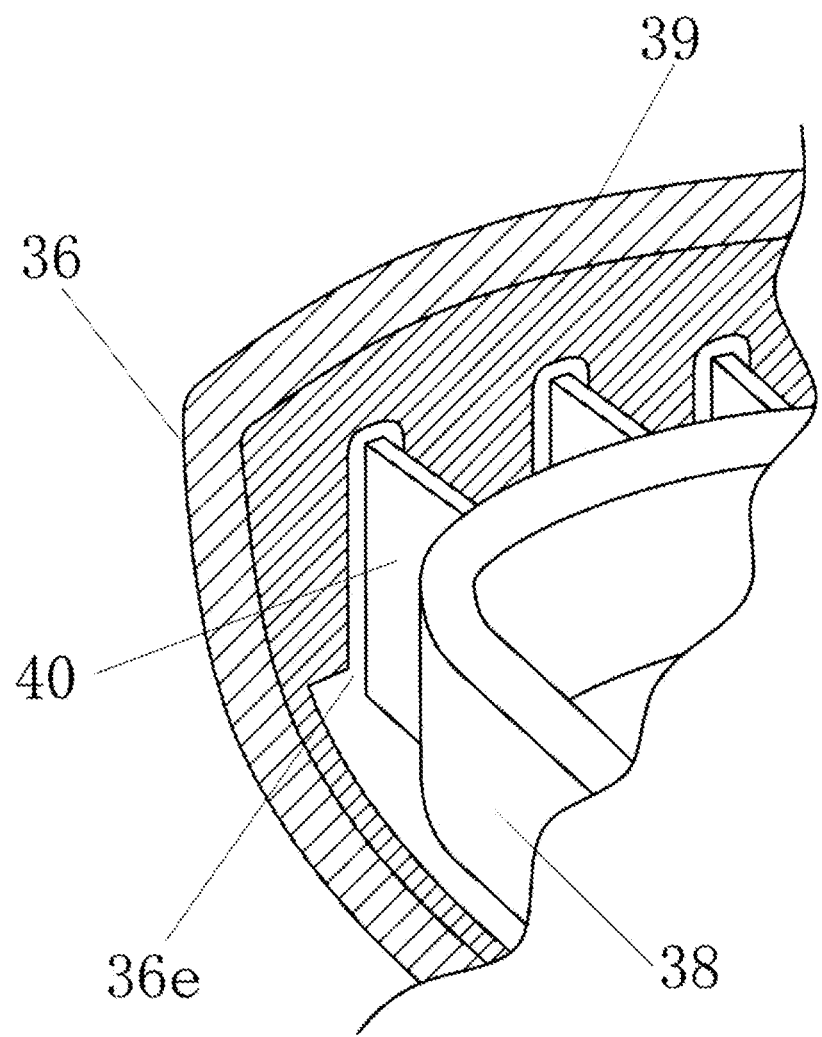
FIG. 3 is a partially enlarged perspective view illustrating features of a leather upholstery cover of the steering wheel as one embodiment of the skin-covered interior trim pad according to the present invention.
Figure 4:
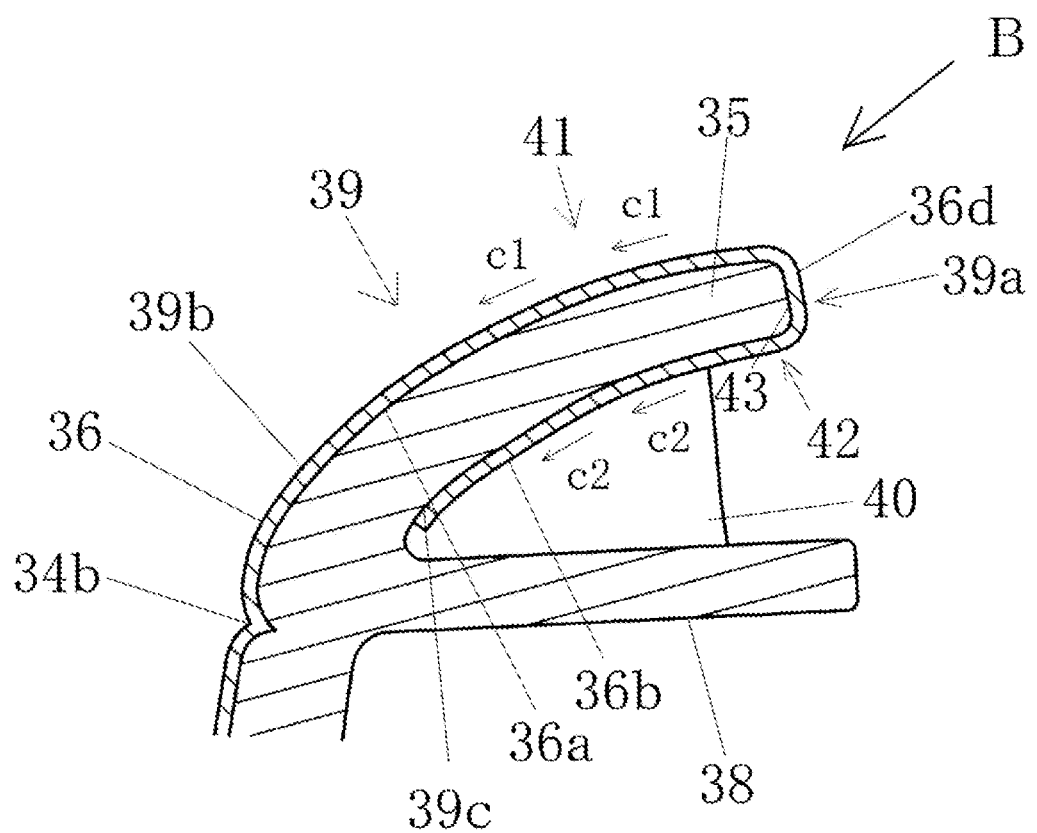
FIG. 4 is a partially enlarged sectional view of an area including an eaves portion of the steering wheel as one embodiment of the skin-covered interior trim pad according to the present invention.

As illustrated in FIG. 3, ribs 40, for example four ribs 40 are disposed in parallel with each other at eaves portion 39 (three of them are illustrated). As illustrated in FIG. 4, eaves-front-surface portion 36a of skin 36 covering front side 41, eaves-back-surface portion 36b of skin 36 covering back side 42, and end edge portion 36d of skin 36 covering end edge portion 39a respectively covers front surface 39b of eaves portion 39, back surface 39c of eaves portion 39, and end portion 43 of eaves portion 39 by means of an adhesive agent applied to their entire surfaces. End edge portion 36d curves along the end portion of eaves portion 39. Eaves-front-surface portion 36a covers front surface 39b of eaves portion 39 on the side of front surface 39b of eaves portion 39. Eaves-front-surface portion 36a is located across end edge portion 36d from eaves-back-surface portion 36b. Eaves-back-surface portion 36b extends on the side of back surface 39c of eaves portion 39 toward the outer edge of front portion 37 to cover back surface 39c of eaves portion 39.

In covering process, an adhesive strength is obtained by close adhesion, for example, by manufacturing a block body in the shape of a space between upright wall 38 and eaves portion 39 from wood, clay, or ultraviolet-curable resin (shaped using a three-dimensional printer), and holding this block body against temporarily inserted eaves-back-surface portion 36b while curing the adhesive agent.

Eaves-back-surface portion 36b is provided with cutouts 36e opened for receiving ribs 40 connecting back surface 39c of eaves portion 39 to upright wall 38 so as to reinforce eaves portion 39 (see FIG. 3). In this way, eaves portion 39 takes the form of a so-called three-layer structure (sandwich structure) of skin, core material, and skin in which eaves portion 39 is provided with eaves-front-surface portion 36a and eaves-back-surface portion 36b over the substantially entire areas of front side 41 and back side 42, respectively.

Next, effects of the skin-covered interior trim pad according to the present invention will be described.

The vehicle cabin temperature would increase to a high temperature due to the sun and the atmospheric temperature in situations such as in a vehicle parked under the blazing sun and tightly shut. Skin 36 of eaves portion 39 shrinks in this case. That is, the cowhide of skin 36 shrinks while an olefin elastomer (TPO) of base material portion 35 is slightly softened and, in contrast to skin 36, the dimensions of base material portion 35 slightly increase (expand).

Eaves portion 39 nevertheless substantially keeps the shape illustrated in FIG. 4. That is, a tensile force is applied in the direction along arrow C1 at the surface of eaves-front-surface portion 36a, but at the same time another tensile force is also applied in the direction along arrow C2 at the surface of eaves-back-surface portion 36b. These tensile forces are equal to each other in magnitude, and therefore eaves portion 39 suffers no substantial visible deformation. In other words, eaves-back-surface portion 36b extends toward the outer edge of front portion 37 such that a tensile force cancelling a tensile force applied to eaves-front-surface portion 36a is applied to eaves-back-surface portion 36b, so that deformation can be prevented. By way of example, it is desirable that the thermal shrinkage rates of eaves-front-surface portion 36a and eaves-back-surface portion 36b be equal to each other.

FIG. 5A illustrates steering wheel 1 of an embodied product of the present invention viewed in the direction of arrow B in FIG. 4. Here, clearance 6 has not increased and is substantially constant along the width direction (the direction of arrow D). In a steering wheel which is not based on the present invention and in which only a margin of an end portion for being wound around is wound around an end edge portion (FIG. 5C), a tensile force is applied in the direction of arrow C1 shown on the surface and there is no force for cancelling the tensile force, so that the skin on a front side is tightened, and as illustrated in FIGS. 5B and 5C the eaves portion is lifted to widen clearance 6' and as a result clearance 6' deforms differently from one place to another depending on the presence or absence of rib 40 so as to be a non-uniform clearance along the direction of arrow D.

If the present invention is applied, it is not necessary to provide a component having eaves portion 39 covered with skin 36 with a shape and structure strong enough to withstand shrinkage. Accordingly, when it is desirable to differentiate between a mass-market grade automobile and an upper grade automobile among automobiles of a single model by the presence or absence of leather, it is advantageous that two kinds of specifications, that is, the specifications for the mass-market grade automobile in which a design surface is a grained surface of resin (the specifications without genuine leather upholstery) and the specifications for the upper grade automobile having genuine leather upholstery are possible by a pad base material intended for use without genuine leather upholstery. A pad base material for the upper grade having the strong structure resistant to deformation do not have to be used also for production of a pad of the mass-market grade, or pad base materials for the respective grades do not have to be prepared, so that the total production cost can be reduced.

INDUSTRIAL APPLICABILITY

The present invention can be utilized for interior trim pads mounted to a variety of automobiles.

REFERENCE SIGNS LIST

1 Steering wheel
2 Steering wheel main body

3 Airbag module
5 Lower cover
6 Clearance
6' Clearance of lifted eaves portion
21 Rim
22 Boss section
23 Spokes
23C Central spoke
23L Left spoke
23R Right spoke
24 Finisher
25 Boss
26 Core metal
27 Cover portion
28 Cowhide
31 Inflator
32 Airbag
33 Container
33a Back plate
33b Retainer
33c Retaining ring
34 Module cover
34a Ornament
34b Dummy stitch
35 Base material portion
36 Skin
36a Eaves-front-surface portion
36b Eaves-back-surface portion
36d End edge portion
36e Cutout
37 Front portion
38 Upright wall
39 Eaves portion
39a End edge portion
39b Front surface
39c Back surface
40 Rib
41 Front side
42 Back side
43 End portion
51 Edge portion

The invention claimed is:

1. A skin-covered interior trim pad, comprising:
a main portion;
an eaves portion extending out from an outer edge of the main portion; and
a skin covering the main portion and the eaves portion, wherein the skin includes:
an end edge portion curving along an end portion of the eaves portion,
an eaves-front-surface portion adhered with an adhesive agent to a front surface of the eaves portion on a side of the front surface of the eaves portion to cover the front surface of the eaves portion, and
an eaves-back-surface portion which extends on a side of a back surface of the eaves portion toward the outer edge of the main portion to be adhered with another adhesive agent to the back surface of the eaves portion to cover the entire back surface of the eaves portion, the eaves-back-surface portion having the same thermal shrinkage rate as the eaves-front-surface portion, and the eaves-front-surface portion being located across the end edge portion from the eaves-back-surface portion.

2. The skin-covered interior trim pad according to claim 1, further comprising:
an upright wall protruding from the outer edge on the side of the back surface of the eaves portion; and
a rib connecting the back surface of the eaves portion to the upright wall, wherein:
the eaves-back-surface portion includes a cutout opened for the rib.

3. The skin-covered interior trim pad according to claim 1, wherein:
the eaves-back-surface portion extends toward the outer edge such that a tensile force cancelling a tensile force applied to the eaves-front-surface portion is applied to the eaves-back-surface portion.

* * * * *